(12) United States Patent
Li et al.

(10) Patent No.: US 11,297,598 B2
(45) Date of Patent: Apr. 5, 2022

(54) METHOD AND DEVICE FOR TRANSMITTING SIGNALS

(71) Applicant: Samsung Electronics Co., Ltd., Gyeonggi-do (KR)

(72) Inventors: Yingyang Li, Beijing (CN); Shichang Zhang, Beijing (CN); Yi Wang, Beijing (CN)

(73) Assignee: Samsung Electronics Co., Ltd

( * ) Notice: Subject to any disclaimer, the term of this patent is extended or adjusted under 35 U.S.C. 154(b) by 185 days.

(21) Appl. No.: 16/476,469

(22) PCT Filed: Jan. 5, 2018

(86) PCT No.: PCT/KR2018/000231
§ 371 (c)(1),
(2) Date: Jul. 8, 2019

(87) PCT Pub. No.: WO2018/128446
PCT Pub. Date: Jul. 12, 2018

(65) Prior Publication Data
US 2021/0127358 A1    Apr. 29, 2021

(30) Foreign Application Priority Data
Jan. 6, 2017  (CN) .......................... 201710011313.0

(51) Int. Cl.
*H04W 72/04* (2009.01)
*H04W 72/00* (2009.01)
(Continued)

(52) U.S. Cl.
CPC ........ *H04W 72/005* (2013.01); *H04B 7/0626* (2013.01); *H04W 56/001* (2013.01);
(Continued)

(58) Field of Classification Search
CPC ............ H04W 72/05; H04W 72/0453; H04W 72/0446; H04W 80/02; H04W 72/042;
(Continued)

(56) References Cited

U.S. PATENT DOCUMENTS 9,253,782 B2    2/2016  Xu et al.
9,258,807 B2 *  2/2016  Choi ..................... H04L 5/0007
(Continued)

FOREIGN PATENT DOCUMENTS

EP    3038276       6/2016
RU    2 605 036     12/2016
(Continued)

OTHER PUBLICATIONS

PCT/ISA/210 Search Report issued on PCT/KR2018/000231, pp. 4.
(Continued)

*Primary Examiner* — Hanh N Nguyen
(74) *Attorney, Agent, or Firm* — The Farrell Law Firm, P.C.

(57) ABSTRACT

The present application provides a method for transmitting signals, which includes the following. A device determines time-frequency resources for transmitting a first type of system information and a second type of system information according to a synchronizing signal and/or a broadcast channel, determines a reference signal (RS) for demodulating the first type of system information and the second type of system information according to the time-frequency resources, and transmits the first type of system information, the second type of system information and the corresponding reference signal.

14 Claims, 8 Drawing Sheets

(51) Int. Cl.
*H04B 7/06* (2006.01)
*H04W 56/00* (2009.01)
*H04W 80/02* (2009.01)
*H04L 5/00* (2006.01)

(52) U.S. Cl.
CPC ..... *H04W 72/042* (2013.01); *H04W 72/0446* (2013.01); *H04W 72/0453* (2013.01); *H04W 80/02* (2013.01); *H04L 5/0005* (2013.01)

(58) Field of Classification Search
CPC ... H04W 56/001; H04W 56/00; H04W 48/12; H04W 72/0406; H04W 72/044; H04W 48/08; H04B 7/0626; H04L 5/0005; H04L 5/0053; H04L 1/0038; H04L 1/0009; H04L 5/0048; H04L 5/0044; H04J 11/0069
See application file for complete search history.

(56) References Cited

U.S. PATENT DOCUMENTS

| | | | |
|---|---|---|---|
| 9,496,919 | B2 | 11/2016 | Rikkinen et al. |
| 10,523,285 | B2 * | 12/2019 | Davydov ............... H04L 5/0094 |
| 10,863,459 | B2 * | 12/2020 | Wu ......................... H04W 4/70 |
| 2014/0293946 | A1 | 10/2014 | Suzuki et al. |
| 2015/0043456 | A1 | 2/2015 | Rikkinen et al. |
| 2015/0188676 | A1 | 7/2015 | Kim et al. |
| 2015/0245330 | A1 | 8/2015 | Sartori et al. |
| 2016/0183250 | A1 | 6/2016 | Fang et al. |
| 2016/0345296 | A1 | 11/2016 | Xu et al. |
| 2017/0195031 | A1 * | 7/2017 | Onggosanusi ....... H04B 7/0626 |
| 2019/0059118 | A1 * | 2/2019 | Kato ................... H04W 72/048 |
| 2020/0304356 | A1 * | 9/2020 | Xue ..................... H04L 27/2666 |

FOREIGN PATENT DOCUMENTS

| | | |
|---|---|---|
| WO | WO 2012/152149 | 11/2012 |
| WO | WO 2014098402 | 6/2014 |

OTHER PUBLICATIONS

PCT/ISA/237 Written Opinion issued on PCT/KR2018/000231, pp. 6.
European Search Report dated Nov. 27, 2019 issued in counterpart application No. 18736594.5-1215, 10 pages.
Russian Decision to Grant dated Jul. 14, 2020 issued in counterpart application No. 2019124729/07, 18 pages.
NTT Docomo, Inc., "Discussion on Initial Access Design for NR", R1-1610073, 3GPP TSG RAN WG1 Meeting #86bis, Oct. 10-14, 2016, 7 pages.
InterDigital Communications, "A Framework for Initial Access for NR", R1-1612309, 3GPP TSG-RAN WG1 #87, Nov. 14-18, 2016, 5 pages.
Korean Office Action dated Feb. 3, 2021 issued in counterpart application No. 10-2019-7019656, 10 pages.
Indian Examination Report dated Mar. 19, 2021 issued in counterpart application No. 201937030393, 6 pages.

* cited by examiner

[Fig. 1]
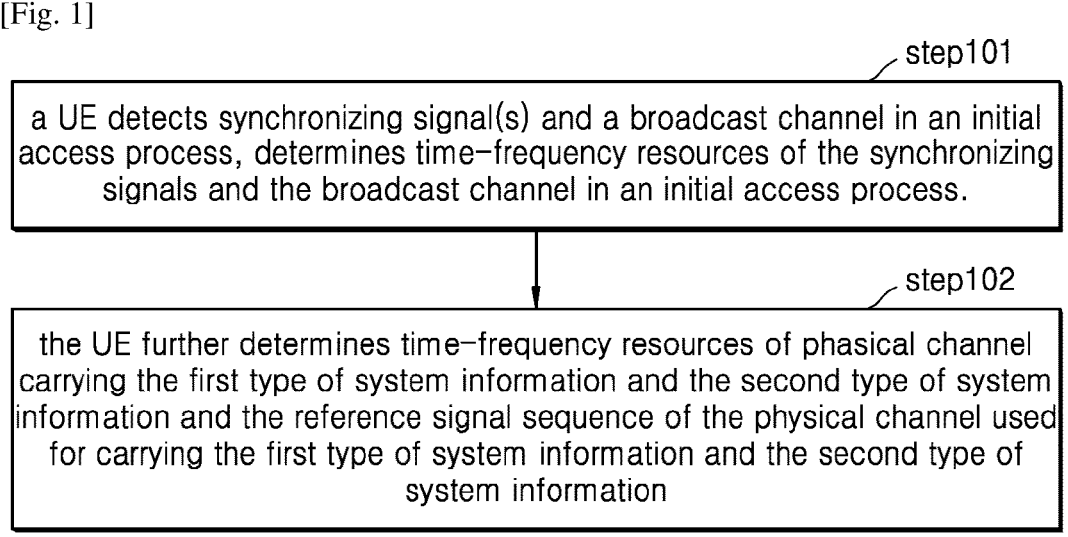

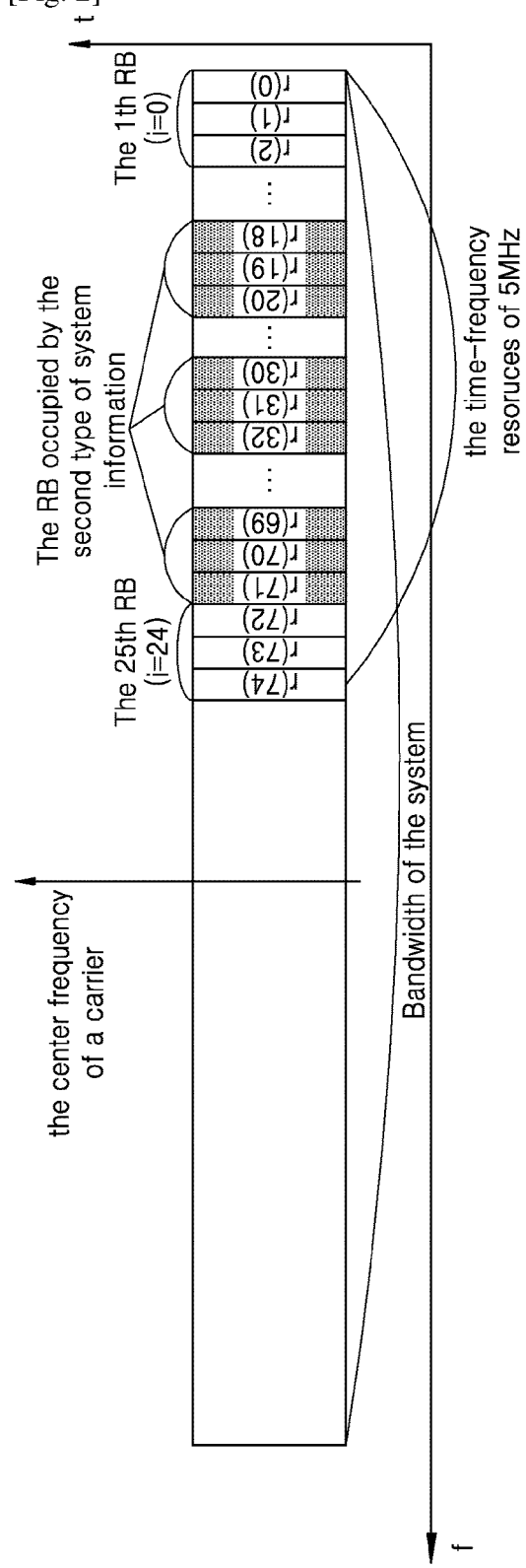
[Fig. 2]

[Fig. 3]
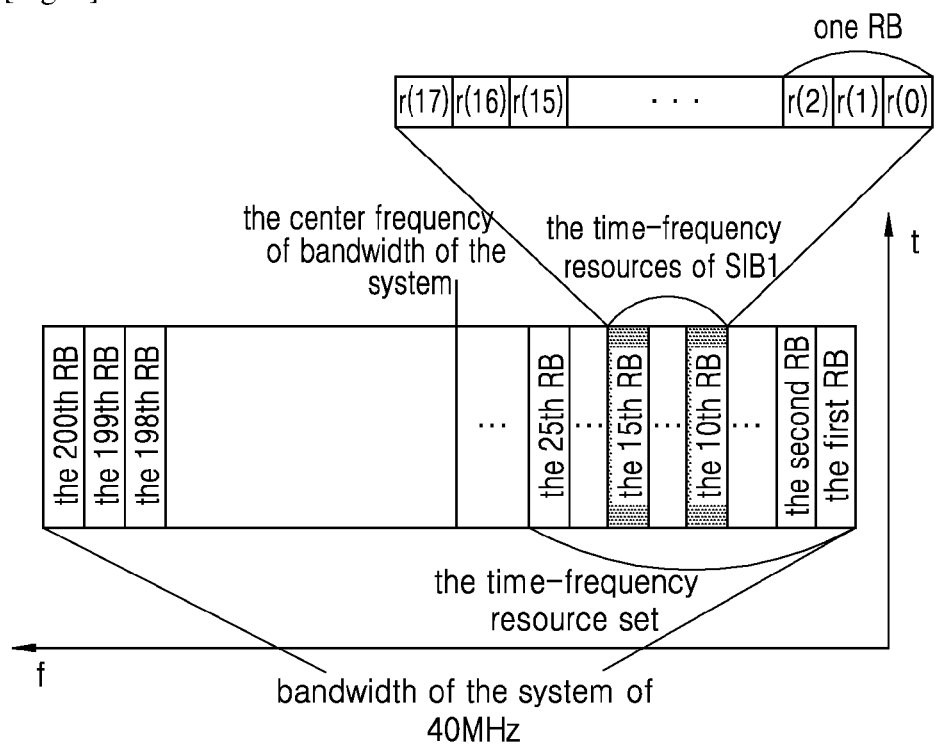
[Fig. 4]
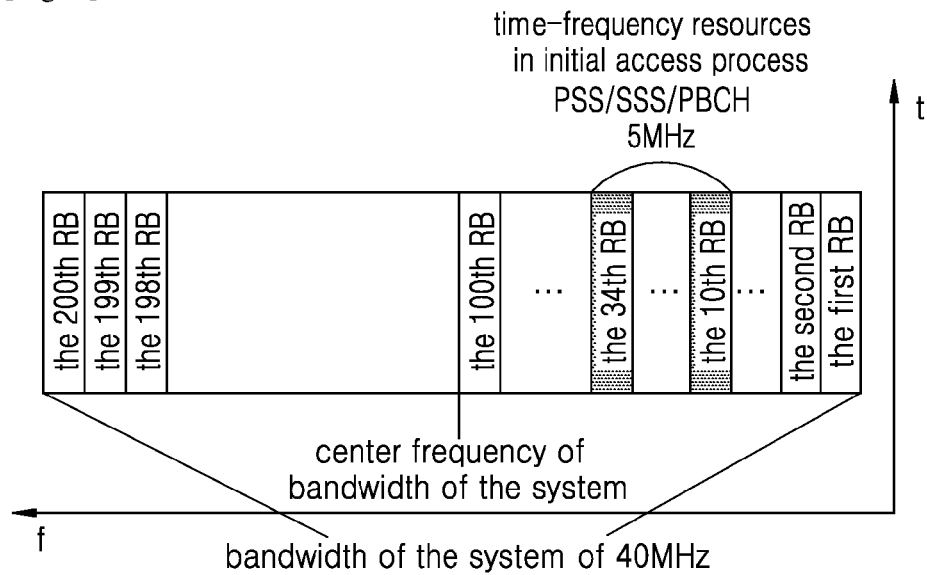

[Fig. 5]
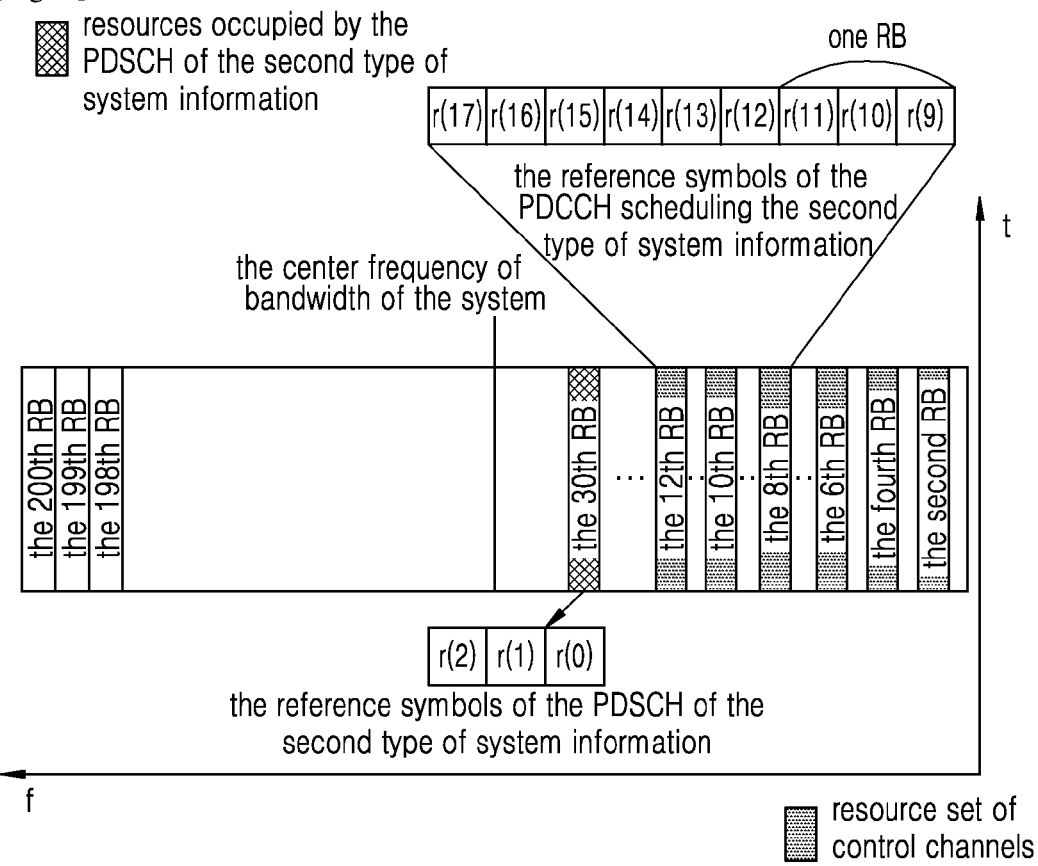

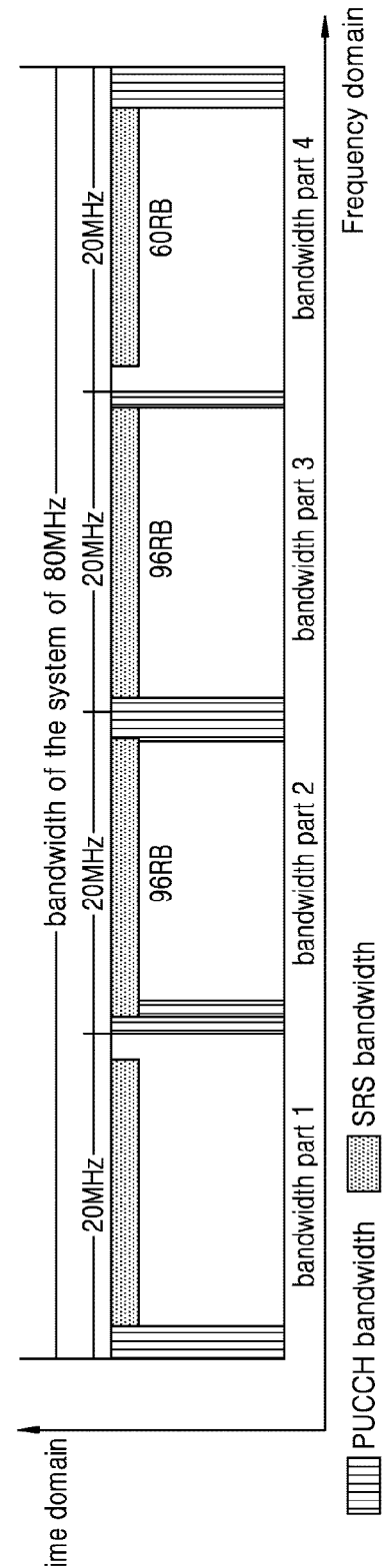
[Fig. 6]

[Fig. 7]
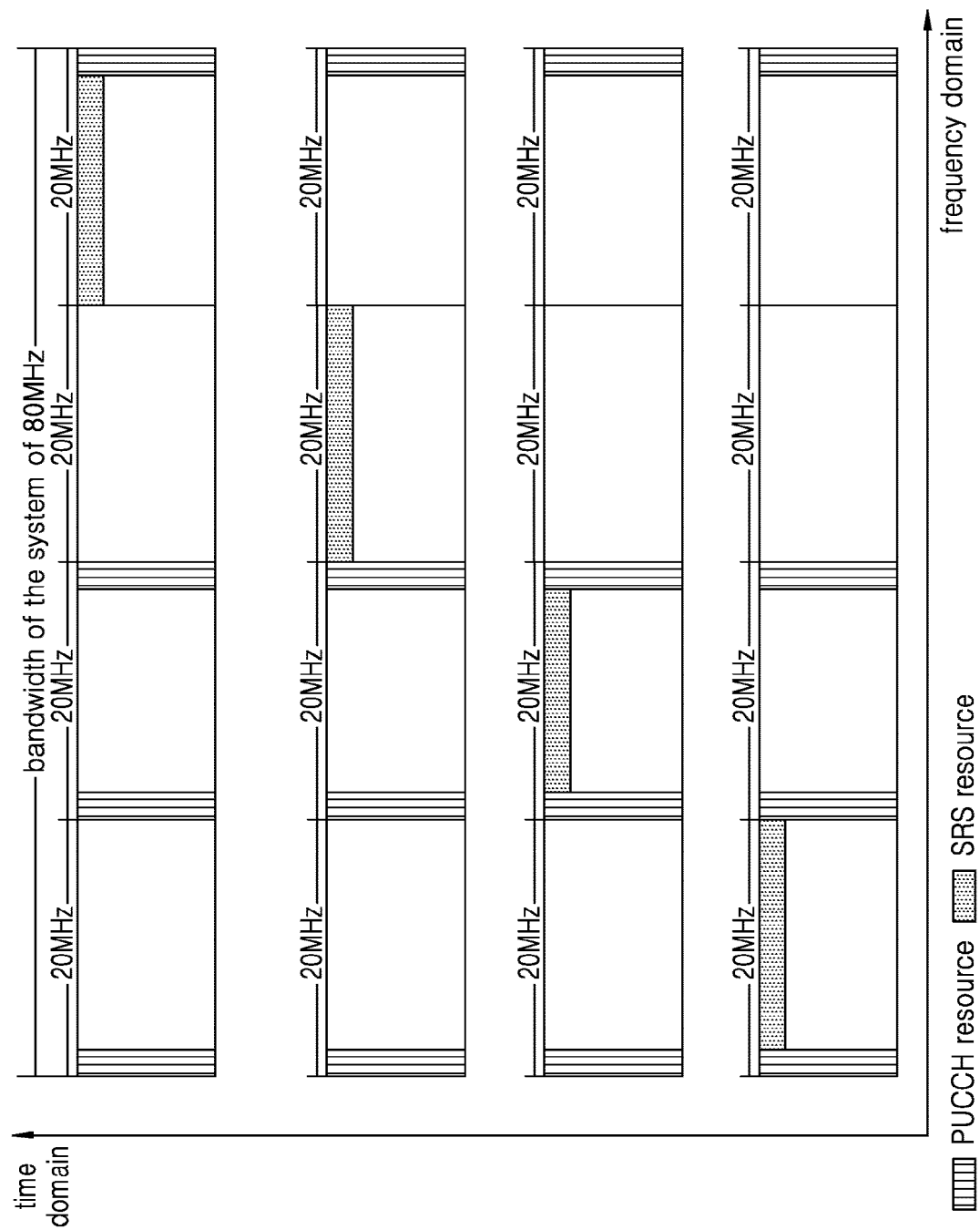

[Fig. 8]
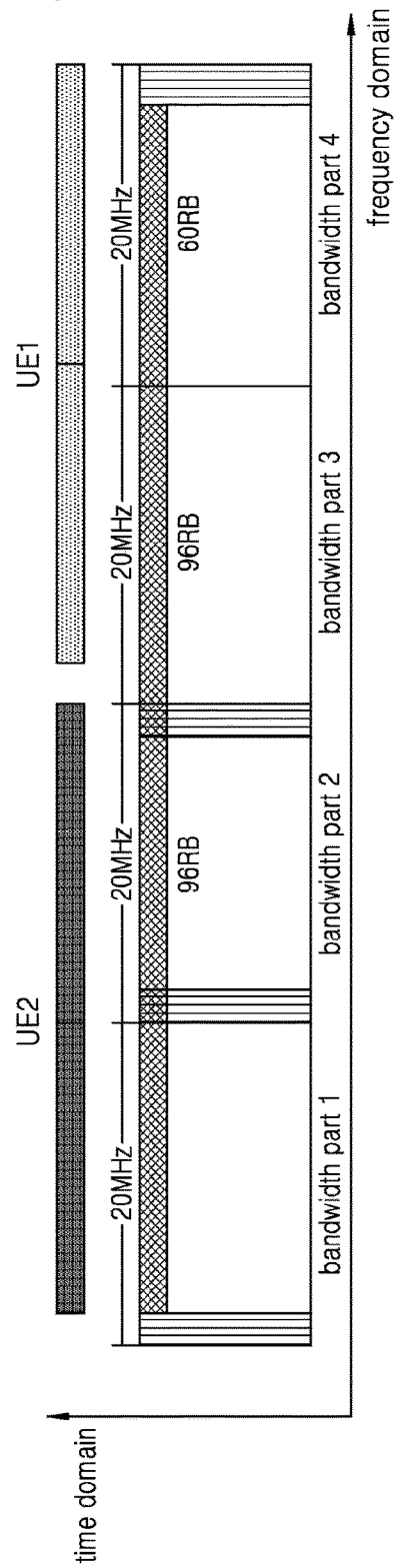
[Fig. 9]
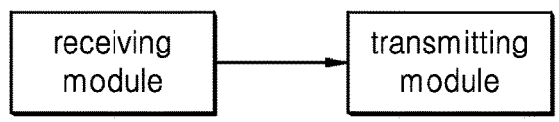

[Fig. 10]
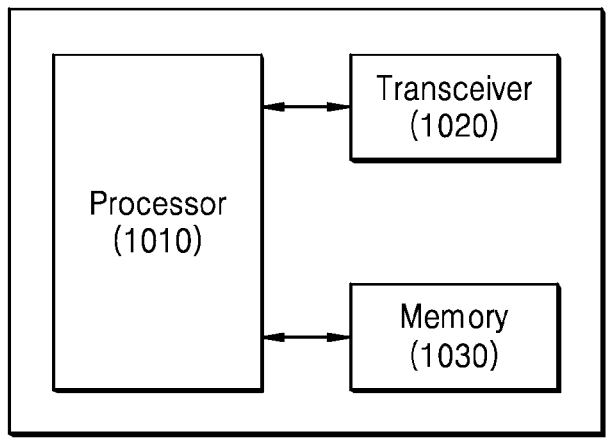
[Fig. 11]
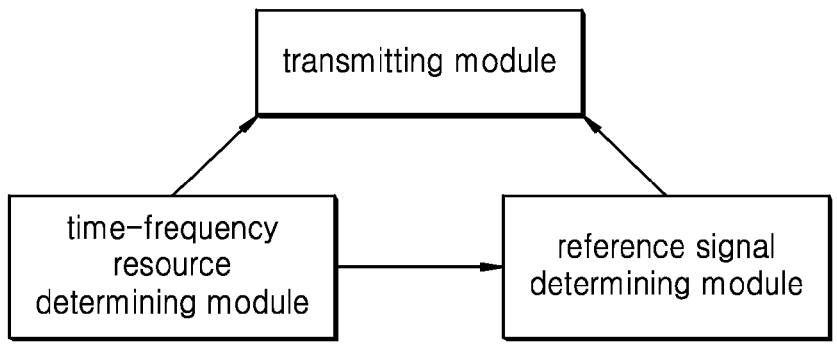
[Fig. 12]
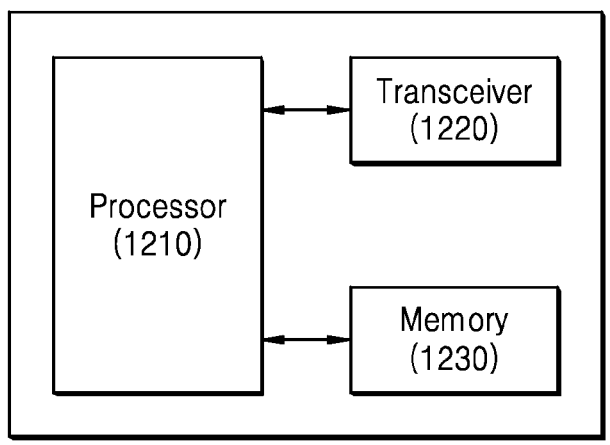

METHOD AND DEVICE FOR TRANSMITTING SIGNALS

PRIORITY

This application is a National Phase Entry of PCT International Application No. PCT/KR2018/000231 which was filed on Jan. 5, 2018, and claims priority to Chinese Patent Application No. 201710011313.0, which was filed on Jan. 6, 2017, the content of each of which is incorporated herein by reference.

TECHNICAL FIELD

The present disclosure relates to mobile communication technologies, and in particular, to a method and a device for transmitting a reference signal.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Technical Problem

The present application provides a method for transmitting signals, which include the following. A device determines time-frequency resources for transmitting a first type of system information and a second type of system information according to a synchronizing signal and/or a broadcast channel, determines a reference signal for demodulating the first type of system information and the second type of system information according to the time-frequency resources, and transmits the first type of system information, the second type of system information and the corresponding reference signal.

BRIEF DESCRIPTION OF DRAWINGS

FIG. 1 is a flowchart for explaining a method according to an embodiment of the present application.

FIG. 2 is a first schematic diagram according to a first embodiment of the present application.

FIG. 3 is a second schematic diagram according to a first embodiment of the present application.

FIG. 4 is a third schematic diagram according to a first embodiment of the present application.

FIG. 5 is a fourth schematic diagram according to a first embodiment of the present application.

FIG. 6 through FIG. 8 are schematic diagrams according to a second embodiment of the present application.

FIG. 9 is a diagram of a receiving device according to an embodiment of the present application.

FIG. 10 is a diagram of a receiving device according to another embodiment of the present application.

FIG. 11 is a diagram of a sending device according to an embodiment of the present application.

FIG. 12 is a diagram of a sending device according to another embodiment of the present disclosure.

BEST MODE FOR CARRYING OUT THE INVENTION

The present application provides a method and device for transmitting signals. This application provides a method for determining generation of the reference signal in an initial access process, so that the UE can determine the reference signal before center frequency and bandwidth of a carrier of a serving cell are obtained, and demodulate the system information according to the reference signal.

The present application also provides a method for transmitting reference signal. By configuring and indicating transmission information of the reference signal of each bandwidth part and rate matching information of the corresponding physical channel, the reference signal and the physical channel transmitted by the UEs with different bandwidth capabilities are orthogonal to each other.

In order to achieve the above object, the present application adopts the following technical solutions: A method for transmitting signals, comprising: determining time-frequency resources for transmitting a first type of system information and a second type of system information according to a synchronizing signal and/or a broadcast channel; determining a reference signal for demodulating the first type of system information and the second type of system information according to the time-frequency resources; transmitting the first type of system information, the second type of system information and the corresponding reference signal.

Preferably, before determining the time-frequency resources for transmitting the first type of system information and the second type of system information according to the synchronizing signal and/or the broadcast channel, the method may further comprise: determining time-frequency resources of the synchronizing signal and the broadcast channel in an initial access process; wherein, the center frequency of the time-frequency resources of the synchronizing signal and the broadcast channel is or is not located in the center frequency of a carrier.

Preferably, the second type of system information may comprise system information for determining the center frequency of a carriers of a serving cell; and the first type of system information comprises system information for determining the time-frequency resources of the second type of system information.

Preferably, the system information for determining the time-frequency resources of the second type of system information comprises: configuration information used for configuring a time-frequency resource set of control signaling for scheduling the second type of system information; or implicit indication information used for implicitly indicating the second type of system information and the time-frequency resource set of the control signaling for scheduling the second type of system information.

Preferably, the determining the time-frequency resources for transmitting the first type of system information comprises at least one of the following: receiving the broadcast channel, determining the time-frequency resources of the first type of system information according to indication of the broadcast channel; and receiving the broadcast channel, determining the time-frequency resources of the first type of system information according to the time-frequency resources of the broadcast channel and predefined mapping relationship; and/or the determining the time-frequency resources for transmitting the second type of system information comprises at least one of the following: receiving the broadcast channel, determining the time-frequency resources of the second type of system information according to indication of the broadcast channel; receiving the broadcast channel, determining the time-frequency resources of the second type of system information according to the time-frequency resources of the broadcast channel and predefined mapping relationship; and receiving the first type of system information, determining the time-frequency resources of the second type of system information according to indication of the first type of system information.

Preferably, the time-frequency resources of the broadcast channel and predefined mapping relationship comprise at least one of the following: frequency resources occupied by a time-frequency resource set of a control signaling for scheduling the first type of system information are within a predefined bandwidth which is centered on frequency resources occupied by the synchronizing signal and the broadcast channel; frequency resources occupied by a time-frequency resource set of the first type of system information are within a predefined bandwidth which is centered on frequency resources occupied by the synchronizing signal and the broadcast channel; frequency resources occupied by a time-frequency resource set of a control signaling for scheduling the second type of system information are within a predefined bandwidth which is centered on frequency resources occupied by the synchronizing signal and the broadcast channel; frequency resources occupied by a time-frequency resource set of the second type of system information are within a predefined bandwidth which is centered on frequency resources occupied by the synchronizing signal and the broadcast channel.

Preferably, the determining the time-frequency resources of the first type of system information according to the indication of the broadcast channel comprises at least one of the following: indicating, by the broadcast channel, a time-frequency resource set of a downlink control signaling of the first type of system information; and determining the time-frequency resource set of the downlink control signaling of the first type of system information according to indication of the broadcast channel; indicating, by the broadcast channel, a time-frequency resource set of the first type of system information; and determining the time-frequency resource set of the first type of system information according to the broadcast channel; and indicating, by the broadcast channel, the time-frequency resource sets of the downlink control signaling for scheduling the first type of system information; indicating, by the downlink control signaling scheduling the first type of system information, the time-frequency resources of the first type of system information; determining the time-frequency resource set of the downlink control signaling of the first type of system information according to the broadcast channel; detecting the downlink control signaling of the first type of system information; and determining the time-frequency resources of the first type of system information according to the downlink control signaling scheduling the first type of system information.

Preferably, the determining the time-frequency resources of the second type of system information according to the indication of the broadcast channel comprises at least one of the following: indicating, by the broadcast channel, a time-frequency resource set of a downlink control signaling of the second type of system information; and determining the time-frequency resource set of the downlink control signaling of the second type of system information according to indication of the broadcast channel; indicating, by the broadcast channel, a time-frequency resource set of the second type of system information; and determining the time-frequency resource set of the second type of system information according to the broadcast channel; indicating, by the broadcast channel, the time-frequency resource set of the downlink control signaling for scheduling the second type of system information; indicating by the downlink control signaling scheduling the second type of system information, the time-frequency resources of the second type of system information; determining the time-frequency resource set of the downlink control signaling of the second type of system information according to the broadcast channel; detecting the downlink control signaling of the second type of system information; and determining the time-frequency resources of the second type of system information according to the downlink control signaling scheduling the second type of system information.

Preferably, the determining the reference signal for demodulating the first type of system information and the second type of system information comprises at least one of the following: determining the length of the reference signal sequence of a downlink control signaling for scheduling the first type of system information according to the bandwidth of time-frequency resource set of the downlink control signaling for scheduling the first type of system information; determining the length of the reference signal sequence of a downlink control signaling for scheduling the second type of system information according to the bandwidth of time-frequency resource set of the downlink control signaling for scheduling the second type of system information; determining the length of the reference signal sequence of the downlink control signaling for scheduling the first type of system information according to the bandwidth of time-frequency resources occupied by the transmitted downlink control signaling for scheduling the first type of system information; determining the length of the reference signal sequence of the downlink control signaling for scheduling the second type of system information according to the bandwidth of time-frequency resources occupied by the transmitted downlink control signaling for scheduling the second type of system information; determining the length of the reference signal sequence of the downlink control signaling for scheduling the first type of system information and the length of the reference signal sequence of the downlink control signaling for scheduling the second type of system information according to the bandwidth of a system; determining the length of the reference signal sequence of the downlink control signaling for scheduling the first type of system information and the length of the reference signal sequence of the downlink control signaling for scheduling the second type of system information according to a predefined maximum bandwidth of the system.

Preferably, the determining the reference signal for demodulating the first type of system information and the second type of system information comprises at least one of the following: determining the length of the reference signal sequence of the first type of system information according to the bandwidth of a time-frequency resource set of the first type of system information; determining the length of the reference signal sequence of the second type of system information according to the bandwidth of a time-frequency resource set of the second type of system information; determining the length of the reference signal sequence of the first type of system information according to the bandwidth of time-frequency resources occupied by the transmitted first type of system information; determining the length of the reference signal sequence of the second type of system information according to the bandwidth of time-frequency resources occupied by the transmitted second type of system information; determining the length of the reference signal sequence of the first type of system information and the length of the sequence of the reference signal of the second type of system information according to the bandwidth of a system; and determining the length of the reference signal sequence of the first type of system information and the length of the sequence of the reference signal of the second type of system information according to a predefined maximum bandwidth of the system.

Preferably, the determining the reference signal for demodulating the first type of system information and the second type of system information comprises at least one of the following: determining the time-frequency resources of the reference signal according to time-frequency resources of a downlink control signaling; and determining the reference signal sequence of the downlink control signaling for scheduling the first type of system information and the reference signal sequence of the downlink control signaling for scheduling the second type of system information according to a relative position of the frequency of the reference signal in the time-frequency resource set of the downlink control signaling or in the time-frequency resources occupied by the transmitted downlink control signaling; determining the time-frequency resources of the reference signal according to the time-frequency resources of the downlink control signaling, and determining the reference signal sequence of the first type of system information and the second type of system information according to a relative position of the frequency of the reference signal in the time-frequency resource set of the system information or in the time-frequency resources occupied by the system information.

A method for transmitting a reference signal, comprising: receiving, by a terminal, information of one or multiple sets of resource configurations of the reference signal, wherein, the information of resource configurations of the reference signal comprises at least one of the following: information of time-frequency resource configurations of the reference signal mapped to consecutive physical resource blocks within a full bandwidth of a system, information of time-frequency resource configurations of the reference signal mapped to consecutive physical resource blocks within multiple bandwidth parts of the full bandwidth of the system, information of time-frequency resource configurations of the reference signal mapped to consecutive physical resource blocks within one bandwidth part of the full bandwidth of the system; transmitting the reference signal according to the information of resource configurations of the reference signal and an indication for transmitting the reference signal.

Preferably, the indication for transmitting the reference signal is used for, indicating the transmission of the reference signal in the consecutive physical resource blocks within the full bandwidth or in the consecutive physical resource blocks within the multiple bandwidth parts of the full bandwidth; and/or indicating the abandonment of the transmission of the reference signal within one or multiple bandwidth parts.

A device for transmitting date, comprising: a time-frequency resource determining module, to determine time-frequency resources for transmitting a first type of system information and a second type of system information according to a synchronizing signal and a broadcast channel; a reference signal determining module, to determine a reference signal for demodulating the first type of system information and the second type of system information according to the time-frequency resources; and a transmitting module, to transmit the first type of system information, the second type of system information and the corresponding reference signal.

A device for transmitting date, comprising: a receiving module, to receive information of one or multiple sets of resource configurations of a reference signal, wherein, the information of resource configurations of the reference signal comprises at least one of the following: information of time-frequency resource configurations of the reference signal mapped to consecutive physical resource blocks within a full bandwidth of a system, information of time-frequency resource configurations of the reference signal mapped to consecutive physical resource blocks within multiple bandwidth parts of the full bandwidth of the system, information of time-frequency resource configurations of the reference signal mapped to consecutive physical resource blocks within one bandwidth part of the full bandwidth of the system; a transmitting module, to transmit the reference signal according to the information of resource configurations of the reference signal and an indication for transmitting the reference signal.

MODE FOR THE INVENTION

With rapid developments of information industry, growing demands from mobile internet and internet of things (IoT, internet of things) bring unprecedented challenges to mobile communication technologies in the future. According to ITU-R M.[IMT.BEYOND 2020.TRAFFIC], it can be expected that the growth of volume of business of mobile will be nearly 1,000 times higher than that in 2010 (4G era). And the number of connections of user's devices will exceed 17 billion by 2020. With massive IoT devices gradually penetrating into the mobile network, the number of connected devices will be even more amazing. In order to cope with these unprecedented challenges, the communications industry and academia have carried on extensive research on the 5th generation mobile communication technology (5G), facing the 2020s. At present, the framework and overall goals of the future 5G are already discussed in the ITU report ITU-R M.[IMT.VISION], the demand outlook, application scenarios and important performance indicators of 5G are described in detail in the report. In view of the new requirements of 5G, information about the technology trends of 5G is provides in the ITU report ITU-R M.[IMT.FUTURE TECHNOLOGY TRENDS], to solve the significant problems of the significantly increasing of system throughput, the consistency of the experience of user, the extensibility to support the IoT, the delay, the energy efficiency, the cost, the flexibility of the network, the support of emerging business and the flexibility of the utilization of spectrum. In 3GPP, the first stage of the work of 5G is already in progress. In order to support more flexible systems, in 5G systems, terminals with different bandwidth capabilities can be served by the same serving cell. For example, the bandwidth of the serving cell is 80 MHz, some terminals can only support the bandwidth of 20 MHz, and other terminals can support the bandwidth of 80 MHz, while the serving cell can provide services to all of the terminals at the same time. In addition, in the system of 5G, a serving cell can provide services with different subcarrier intervals. For example, a serving cell can provide broadband service of 15 KHz eMBB on partial bandwidth, and provide high reliable and low delay service of 60 KHz on the rest of the bandwidth. In order to support flexible bandwidth allocation, in the system of 5G, the signal/channel in an initial access process, such as PSS/SSS, broadcast channel (PBCH) and so on, are not necessarily at the center of the bandwidth of the system. The base station can inform terminal the location of the center frequency of the bandwidth of the system and the bandwidth of the system through the broadcast information. The terminal is able to communicate on other frequency resources of the bandwidth of the system after obtaining this information. The terminal can only communicate within the bandwidth part of the initial access before obtaining this information. Therefore, reference signals and physical channels involved in communication within the bandwidth part of the initial access should have the ability of independently demodulating within this bandwidth part. However, the demodulation of the system information in the existing LTE system is based on the assumption that PSS/SSS/PBCH is located at the six PRB of the central frequency point of the bandwidth of the system, which can not be used in the system of 5G.

Moreover, because the terminals with different maximum bandwidth coexist in the same network, the transmission of the reference signals and physical channels of different terminals may occupy different bandwidths. In the existing LTE systems, the CSI-RS only supports full bandwidth transmission. Therefore, the zero power RS (ZP-RS) for rate matching of downlink data channel is also fully bandwidth configured. However, in the system of 5G, the CSI-RS can support bandwidth part transmission. And the bandwidth parts of the CSI-RS of different terminals are likely to be different. Therefore, the existing ZP-RS configured full bandwidth allocation will lead to discarding of unnecessary downlink data. In the existing LTE systems, the PUCCH is usually located at both ends of the bandwidth of the system. In order to avoid collisions between SRS and PUCCH, SRS is sent with physical resources which are not overlapped with the PUCCH. Moreover, because of the common subframe of the SRS of serving cell, the PUCCH or PUSCH can empty the last symbol in the common subframe of the SRS of serving cell to avoid collision with the PUCCH. However, in the system of 5G, for terminals with a narrow bandwidth part, it is possible that the PUCCH is not located at the both ends of the bandwidth of the system, so the bandwidth of the PUCCH may overlap with the bandwidth of the SRS. In order to solve the above problems, a new transmitting and receiving method is need to design for the CSI-RS and the SRS of the system of 5G.

The embodiments of the present disclosure will be described in detail below. Reference numbers of the described embodiments are shown in corresponding drawings, wherein, the same or similar reference number refer to the same or similar element or element having the same or similar functions throughout. The embodiments described below with accompany of drawings are exemplary, which are for the purpose of explaining the invention, but are not intended to limit the present disclosure.

FIG. 1 is a flowchart for explaining a method according to an embodiment of the present application.

The First Embodiment

In Step 101, a UE detects synchronizing signal(s) and a broadcast channel in an initial access process, determines time-frequency resources of the synchronizing signals and the broadcast channel in an initial access process.

The synchronizing signals in the initial access process includes at least a synchronizing signal for determining initial time-frequency synchronization and/or the ID of a serving cell. For example, the synchronizing signal may be a PSS/SSS.

Preferably, the broadcast channel PBCH in the initial access process may include the information for determining a frame index, and/or the information required for random access, and/or the information required for determining basic system message, and/or information relating to configurations of beams.

Preferably, the center frequency of the synchronizing signal and the broadcast channel in the initial access process may be or may be not located in the center frequency of a carrier of the serving cell.

Preferably, the relationship between the synchronizing signal in the initial access process and the time-frequency resources of the broadcast channel in the initial access process may be determined. That is, the UE can determine the time-frequency resources of the broadcast channel by detecting the synchronizing signal. For example, the synchronizing signal and the broadcast channel are time division, or frequency division, the relationship between the synchronizing signal and the time-frequency resources are determined.

The relationship between the center frequency of a carrier of the serving cell (or the bandwidth of the system of the serving cell) and the time-frequency resources of the synchronizing signal and the broadcast channel in the initial access process is one of M kinds of predefined relative relationships. Wherein, the values of M, and the M kinds of possible relative relationships are predefined in standards. The base station may transmit the synchronizing signal and the broadcast channel in the initial access process at one of the M kinds of predefined possible locations.

In step 102: the UE further determines time-frequency resources of physical channel carrying the first type of system information and the second type of system information and the reference signal sequence of the physical channel used for carrying the first type of system information and the second type of system information.

The second type of system information includes system information for obtaining information on the center frequency of a carrier of the serving cell. The information of the center frequency is jointly determined by the offset of the time-frequency resources of the synchronizing signal and the broadcast channel in the initial access process relative to the center frequency of a carrier of the serving cell and/or the channel raster. The offset of the time-frequency resources of the signal/channel in the initial access process relative to the center frequency takes a resource block as the minimum granularity of indication, or takes resource block group (RGB) as the minimum granularity of indication, or takes the minimum bandwidth of time-frequency of the synchronizing signal and the broadcast channel in the initial access process as the minimum granularity of indication, or indicates one of Predefined M possible offset relationships.

The second type of system information may include the bandwidth of a carrier of the serving cell. The bandwidth of the serving cell may be indicated before the second type of system information is sent or after the second type of system information is sent.

The first type of system information is demodulated before the second type of system information in the initial access process by the UE. For example, the first type of system information includes the information on the time-frequency resources of the second type of system information. Therefore, the UE must demodulate the first type of system information first, and then demodulate the second type of system information. It can be understood that the correct receiving of the first kind of system information does not depend on the demodulation of the second kinds of system information. The first type of system information is not limited to one system message, and it can be a number of system messages.

Preferably, the second type of system information may be carried by the PBCH. In this case, the first type of system information may not exist.

Preferably, the second type of system information may be carried by the PDSCH. The resources occupied by PDSCH carrying the second type of system information and/or a resource set of the PDSCH carrying the second type of system information and the downlink control channel PDCCH scheduling the PDSCH of the second type of system information are indicated by the PBCH. In this case, it can be understood that the first type of system information can be the PBCH. The resource set refers to the collection of time-frequency resources that may be scheduled. For the PDCCH, the resource set is resource collections within which the PDCCH is detected or may be configured as resource collections within which the PDCCH is detected. The resource collections within which the PDCCH is detected are such that the UE monitors the PDCCH within the resource set. The resource collections that may be configured as resource collections within which the PDCCH is detected are such that the base station configures part of the resource collections as the resource set within which the PDCCH is monitored, and the UE monitors the PDCCH within the resource set.

Preferably, the second type of system information may be carried by the PDSCH. The resources and/or resource set occupied by the PDSCH carrying the second type of system information and/or the downlink control channel PDCCH scheduling the PDSCH of the second type of system information are indicated by the first type of system information.

Preferably, the second type of system information may be carried by the PDSCH. The resource set of the PDSCH carrying the second type of system information and/or the downlink control channel PDCCH scheduling the PDSCH of the second type of system information are implicitly determined by resources of the PSS/SSS/PBCH determined in the step 101. For example, the PSS/SSS/PBCH may occupy frequency resources of 5 MHz. The resource set of the PDSCH carrying the second type of system information and/or the downlink control channel PDCCH scheduling the PDSCH of the second type of system information are the resources of 20 MHz centered on the frequency resources of 5 MHz. The resources occupied by the PDSCH carrying the second type of system information and/or the downlink control channel PDCCH scheduling the PDSCH of the second type of system information can be part of frequency resources of 20 MHz. The resources occupied can be dynamically indicated, but it must be within this resource of 20 MHz. For example, assuming that the PSS/SSS/PBCH occupies frequency resources of 5 MHz, the resource set of the PDSCH carrying the second type of system information and/or the downlink control channel PDCCH scheduling the PDSCH of the second type of system information are the frequency resources of 5 MHz. Note that, the time domain resource may be different, such as the PSS/SSS/PBCH and the PDSCH are in different downlink slots. Preferably, the same may apply to the resource set of the PDSCH carrying the first type of system information and/or the downlink control channel PDCCH scheduling the PDSCH of the first type of system information.

Preferably, the second type of system information may be carried by the PDSCH. The resource set of the PDSCH carrying the second type of system information and/or the downlink control channel PDCCH scheduling the PDSCH of the second type of system information are indicated by the PBCH or the first type of system information. For example, the PBCH indicates the resource set of the PDCCH scheduling the PDSCH carrying the second type of system information, and the resource of the PDSCH carrying the second type of system information are indicated by the PDCCH. Preferably, the same may apply to the resource set of the PDSCH carrying the first type of system information and the downlink control channel PDCCH scheduling the PDSCH of the first type of system information.

Preferably, the second type of system information may be carried by the PDSCH. When the base station indicates a resource set and occupied resources of the PDSCH carrying the second type of system information and/or the downlink control channel PDCCH scheduling the PDSCH of the second type of system information, taking resources of PSS/SSS/PBCH as reference, the base station indicates the corresponding offset and the resources occupied. For example, taking the center of the time-frequency resources of the PSS/SSS/PBCH as the reference point, the base station indicates how many RBs is the starting points of the resource set and/or the offset of the resources occupied relative to the reference point, and how many RBs does the resource set and/or the resources occupied occupy. For example, the time-frequency resources that the PDCCH may send are the bandwidth of the PSS/SSS/PBCH. The base station indicates which RBs within this bandwidth can serve as resource set of the PDCCH. Assuming that the bandwidth of the PSS/SSS/PBCH is 5 MHz, the base station indicates which RBs within the 5 MHz can be configured as resource sets of the PDCCH. The PDCCH indicates the actual scheduling resource of the PDSCH, which is also within this 5 MHz.

Preferably, the second type of system information may be carried by the PBCH2. The PBCH2 is different from the PBCH in step 101, which is another PBCH parsed from the PBCH. The resources of the PBCH2 carrying the second type of system information is indicated by the PBCH or the first type of system information.

Preferably, the reference signal of the physical channel used for the first type of system information and the second type of system information may be the demodulating reference signal of the physical channel of the first type of system information and the second type of system information. Preferably, the demodulating reference signal may include, the demodulating reference signal of the PBCH, the demodulating reference signal of the PDSCH, or the demodulating reference signal of the downlink control channel PDCCH scheduling the PDSCH, and the like.

Preferably, the reference signal of the physical channel for the first type of system information and the second type of system information may also include the reference signal determining the beam information, such as BRS (beam RS).

Preferably, the generation of the reference signal of the physical channel of the first type of system information and the second type of system information may be independent of the location of time-frequency resources of the physical channel relative to the center frequency of the system. The reference signal may be specifically obtained according to one or more of the following four approaches. Note that, the reference signal may have multiple symbols, and all of these reference signals may be obtained according to the same approach, or may be obtained according to different approaches. For example, the reference signal of PDCCH scheduling the PDSCH carrying the first type of system information and the second type of system information may be obtained according to the first approach, and the reference signal of the PDSCH carrying the first type of system information and the second type of system information may be obtained according to the second approach. For example, both kinds of reference signals may be obtained according to the second approach.

FIG. 2 is a first schematic diagram according to a first embodiment of the present application.

The first approach: the length of the reference signal sequence is determined by the bandwidth of the time-frequency resource set of the PDSCH carrying the first type of system information and the second type of system information and/or the length of the reference signal sequence is determined by the bandwidth of the time-frequency resource set of downlink control channel PDCCH scheduling the PDSCH carrying the first/second type system information. The time-frequency resource set of the PDCCH may be configured as resource collections within which the PDCCH is monitored, or a resource set within which the PDCCH is monitored.

For example, if the reference signal sequence within each time domain symbol is respectively generated, and the number of reference signal within each RB within each time domain symbol is Y, then the reference signal sequence within each time domain symbol r (m) has a total length of $Y*N_{RB}^{DL-in}$, wherein the $N_{RB}^{DL-in}$ is the number of RBs corresponding to the bandwidth of the time-frequency resource set. If the reference signal within all time-domain symbols in a downlink time unit are generated together and the sequence is formed. For example, there are X numbers of time-domain symbols in each downlink slot having reference signal, and the number of reference signal within each RB within each time domain symbol is Y, then the reference signal sequence in each time-domain symbol r(m) has a total length of $X*Y*N_{RB}^{DL-in}$.

Preferably, the mapping of the reference signal may be determined by the relative frequency position of the reference signal within the time-frequency resource set. For example, the bandwidth of the time-frequency resource set is 5 MHz, the corresponding $N_{RB}^{DL-in}$ is 25 number of RB. The reference signal is located at the $i^{th}$ RB in the time-frequency resource set (the range of i is $0\sim N_{RB}^{DL-in}-1$), and at the $j^{th}$ time domain symbol (the range of j is $0\sim X-1$), then, the reference signal sequence is $r(Y*j*N_{RB}^{DL-in}+Y*i)\sim r(Y*j*N_{RB}^{DL-in}+Y*i+Y-1)$, or $(Y*i)\sim r(Y*i+Y-1)$ within the r(m) which is determined by the bandwidth of the time-frequency domain and has the length of $X*Y*N_{RB}^{DL-in}$ or $Y*N_{RB}^{DL-in}$. That is, the reference signal sequence within the bandwidth is extracted from the first reference signal, according to the serial number of RB from small to large. As shown in FIG. 2, assuming the total bandwidth of the time-frequency set is 5 MHz, corresponding to 25 RB, that is $N_{RB}^{DL-in}=25$. Assuming there are three subcarriers in each RB as reference signal, that is Y=3. Take a time domain symbol as example, the base station generates a reference signal sequence having the length of 75, and the reference signal sequence is r(m), wherein, m=0, 1, . . . , 74. Then, the reference signal sequence in the first RB is r (0)~r (2), and the reference signal sequence in the last RB is r (72)~r (74). Note that, the occupied time-frequency resources of the PDSCH carrying the first/second type of system information and/or the downlink control channel PDCCH scheduling the PDSCH carrying the first/second type of system information are part resource of the time-frequency resource set. The corresponding PDSCH/PDCCH and reference signal are sent within the actual transmitting resource.

FIG. 3 is a second schematic diagram according to a first embodiment of the present application.

The second approach: preferably, the length of the reference signal sequence may be determined by the bandwidth of the occupied time-frequency resources of the physical channel corresponding to the reference signal. The mapping of the reference signal is determined by the relative frequency position of the reference signal within the occupied time-frequency resources.

For example, the first type of system information is carried by the SIB1. The second type of system information is carried by the SIB2. Then, the length and mapping of the demodulating reference signals of the PBCH, the PDCCH scheduling the SIB1, the PDSCH carrying the SIB1, the PDCCH scheduling the SIB2, the PDSCH carrying the SIB2 are respectively determined by frequency resources occupied by the PBCH, the PDCCH scheduling the SIB1, the PDSCH carrying the SIB1, the PDCCH scheduling the SIB2, the PDSCH carrying the SIB2. For example, the PDSCH of the SIB1 occupies the 10th RB~the 15th RB of the full bandwidth of the system. Then the length of the demodulating reference signal of the PDSCH is $X*Y*N_{RB}^{PDSCH}$ for $Y* N_{RB}^{PDSCH}$, and the index of RB used for the generation of the sequence of demodulating reference signal of the PDSCH is not 10 to 15, but 0 to 5. In this case, i is the index number of RB in frequency resources occupied by the PDSCH.

Then, the reference signal sequence within the $i^{th}$ RB, within the $j^{th}$ time domain symbol of frequency resources of the PDSCH is $r(Y*j*N_{RB}^{DL-in}+Y*i)\sim r(Y*j*N_{RB}^{DL-in}+Y*i+Y-1)$, or $r(Y*i)\sim r(Y*i+Y-1)$ within r(m), wherein, i=0~5, j=0~X-1. For example, assuming Y=3, X=1, the length of the sequence of r(m) is 6*3*1=18, as shown in FIG. 3. The same applies to the demodulating reference signal of the PDSCH of the SIB2. For example, scheduling the PDSCH of the SIB1 occupies two RBs of the first OFDM symbol of a downlink time unit, and the 2 RB is located at the $11^{th}$ RB and $14^{th}$ RB of the full bandwidth of the system. Still assuming that Y=3, X=1, then the length of r(m) is 2*3*1=6, the r(m) is r(0)~r(2) and r(3)~r(5).

FIG. 4 is a third schematic diagram according to a first embodiment of the present application.

The third approach: Preferably, the length of the reference signal sequence may be determined by the possible maximum bandwidth of the system. The possible maximum bandwidth of the system may be predefined in standards. For example, the bandwidth is 80 MHz. The possible maximum bandwidth of the system may be determined by frequency points. For example, the maximum bandwidth of the high frequency band is 200 MHz, and the maximum bandwidth of the low frequency band is 80 MHz. The mapping of the reference signal is determined by the relative frequency position of the reference signal within the time-frequency resource set, or determined by the relative frequency position of the time-frequency resources occupied by the reference signal in the time-frequency resources occupied by the corresponding physical channel. For example, the reference signal sequence is r(m), wherein, m=0, 1, . . . , 3*400−1 (Y=3, $N_{RB}^{DL-max}$=400, corresponding to the bandwidth of 80 MHz), and the bandwidth of the time-frequency resources is 20 MHz, then the reference signal locating in the $i^{th}$ RB (the range of i is 0~$N_{RB}^{DL-in}$−1, $N_{RB}^{DL-in}$=100) of the time-frequency resource is $r(Y*(N_{RB}^{DL-max}/2-N_{RB}^{DL-in}/2+i))\sim r(Y*(N_{RB}^{DL-max}/2-N_{RB}^{DL-in}/2+i+1)-1)$. Assuming that there are three subcarriers in each RB as reference signal, that is Y=3. Take one time domain symbol as an example. The base station generates a reference signal sequence r(m) having the length of 1200, wherein, m=0, 1, . . . , 1199. Then the reference signal sequence in the first RB is r (450)~r (452), the reference signal sequence in the last RB is r (747)~r (749).

FIG. 5 is a fourth schematic diagram according to a first embodiment of the present application.

The fourth approach: Preferably, the length of the reference signal sequence may be determined by bandwidth of the system $N_{RB}^{DL}$ indicated by the PBCH. The mapping of the reference signal is determined by the relative frequency position of the reference signal within the time-frequency resource set, or determined by the relative frequency position of the time-frequency resources occupied by the reference signal in the time-frequency resources occupied by the corresponding physical channel.

Preferably, the bandwidth of the system indicated by the PBCH may be the bandwidth of the system of the servicing cell.

Preferably, the bandwidth of the system indicated by the PBCH may be the bandwidth for determining the system information.

Preferably, the generation and mapping of other reference signal sequence required after the second type of system information is demodulated, may be determined by the center frequency of the serving cell and/or the bandwidth of the system.

Preferably, if the generation and mapping of other reference signal sequence of the PDCCH required after the second type of system information is demodulated fall into the time-frequency resource set of the PDCCH that scheduling the first/second type of system information, the sequence may be still determined by frequency resources and/or time domain information of the time-frequency resource set, and is independent of the location of the time-frequency resources relative to the center frequency of the system and/or is independent of the relative position in the overall system bandwidth. And the reference signal locating outside the time-frequency resource set may be determined by the center frequency of the bandwidth of the system, and/or, may be determined by the overall bandwidth of the system. The advantage is that the reference signal of the PDCCH can be reused.

The second type of system information can be sent before the system information indicating the random access. The reference signal used in the random access procedure may be determined by the relative position of the RB at which the reference signal locates within the overall bandwidth of the system.

The second type of system information can be sent after the system information indicating the random access. Then, although the PDSCH/PDCCH used in the random access procedure is not the system information, the reference signal required may be processed in accordance with the reference signal of the first type of system information.

For a better description of steps 101 and 102, several examples are given below.

The First Example

The second type of information of the system is sent in the PBCH. The bandwidth of a system of a serving cell is 40 MHz, which is used for transmitting the PSS/SSS/PBCH with the bandwidth of 5 MHz. Assuming the interval of reference subcarriers is 15 KHz, as shown in FIG. 4, the PSS/SSS/PBCH is located at the 10th-34th RB in the bandwidth of the system. Assuming the demodulating reference signal of the PBCH is RS1, there are only one reference signal within each slot, and there are three subcarriers within each RB as reference signal, then, the sequence r(m) of RS1 is r(0),r(1), . . . , r(74). And the reference signal within the first to the twenty-fifth RBs within the bandwidth of 5 MHz are r (0) to r (2), . . . , r (72)~r (74). It is to be noted that the label j of the RB over the overall bandwidth of the system is often not equal to the label i within the bandwidth of 5 MHz. The second type of system information in the PBCH indicates that the center of the time-frequency resources at which the PSS/SSS/PBCH locates is offset from the center of the bandwidth of the system by 78 RBs.

And the demodulating reference signal of the other system information or the other downlink data are determined by the center point of the bandwidth of the system. For example, the base station schedules system information 1 at the 100th RB of the overall bandwidth of the system. The demodulation of reference signal according to the system information 1 can refers to the generation and mapping of the sequence of the DMRS of the existing LTE system. The reference signals in the 100th RB within the entire bandwidth of 40 MHz of the system are r (100*3)~r (100*3+2).

The Second Example

The second type of information of the system is sent in the SIB 1. The bandwidth of a system of a serving cell is 40 MHz. The available bandwidth for transmitting the PSS/SSS/PBCH is 5 MHz. A time-frequency resource set for sending the SIB1 is 20 MHz with the center of the bandwidth of the PSS/SSS/PBCH of 5 MHz. Assuming the interval of subcarriers is 15 KHz, the 5 MHz is located at the 50th-70th RB within the bandwidth of the system, and the 20 MHz is located at the 13th-112th RB in the bandwidth of the system. In the initial access process, the terminal needs to detect the PSS/SSS/PBCH, and then determine a time-frequency resource set of SIB1, and detect the SIB1 in the time-frequency resource set. The PBCH includes information that can be used for the random access procedure. The terminal can be accessed randomly and then reads SIB 1. Then, the generation and mapping of the demodulating reference signal sequence of the PBCH, the demodulating reference signal of the PDSCH or the PDCCH used for the msg2 and msg4 in the random access process, and demodulating reference signal of the PDCCH scheduling the SIB1 and the demodulating reference signal of the PDSCH carrying the SIB1, are all determined according to the 20 MHz, and the demodulating reference signal of the other SIBi (i>1) and the other downlink PDSCH are determined according to the position of the demodulating reference signal relative to the center frequency and the position of the demodulating reference signal within the full bandwidth of the system of 40 MHz. And for the PDCCH scheduling other SIBi or other downlink PDSCH, if the search space of the PDCCH is the same as the search space of the PDCCH scheduling the SIB1, for example, are both a common search space of a cell predefined by the system, or a cell-specific search space, then, the generation of the demodulating reference signal is also the same as the generation of the demodulating reference signal of the SIB1.

The Third Example

The second type of system information is sent in the SIB1. The bandwidth of a system of a serving cell is 40 MHz. The available bandwidth for transmitting the PSS/SSS/PBCH is 5 MHz. The detecting time-frequency resource set of the PDCCH for scheduling the SIB1 is indicated by the PBCH. Assuming that the detecting time-frequency resource set of the PDCCH is N_pdcch RBs of the first OFDM symbol of the downlink slot. The actual transmission of the PDCCH may occupy some of the RBs or all RBs in this N_pdcch RB. Regardless of which RBs are occupied to transmit the PDCCH, the length of the reference signal sequence is determined according to the N_pdcch RBs, and the mapping of the reference signal is determined according to the relative position of the RB occupied for transmitting the PDCCH in the N_pdcch RBs. As shown in FIG. 5, the detecting time-frequency set of the PDCCH occupies 6 RB, which are respectively the 2th, the 4th, the 6th, the 8th, the 10th, the 12th RB within the bandwidth of the entire system. Assuming the transmission of the PDCCH occupies the 8th, the 10th, and the 12th RB. Then, the length of the reference signal sequence is still determined by the six RB. Assuming Y=3, the length of the sequence r(m) is 6*3=18. Since the 8th, 10th, and the 12th RB are the last three RBs in the six RBs, the reference signal sequences of the three RBs are r (9) to r (11), r (12) to r (14) and r (13) to r (17). The actually transmitting time-frequency resources of the PDSCH carrying the SIB1 are indicated by the PDCCH. The length of the reference signal sequence and the mapping of the reference signal are determined by the RBs of frequency resources used for the actual transmission of the PDSCH. For example, frequency resources in the actual transmission of the PDSCH is the 30th RB, the length of the reference signal sequence r (m) is 3RBs, and the sequence is r (0)~r (2).

The Fourth Example

The second type of information of a system is sent in the SIB1. The bandwidth of the system of a serving cell is 40 MHz. The available bandwidth for transmitting the PSS/SSS/PBCH is 5 MHz. The detecting time-frequency resource set of the PDCCH for transmitting the SIB1 is indicated by the PBCH. Assuming that the detecting time-frequency resource set of the PDCCH is the N_pdcch RBs of the first OFDM symbol within the downlink slot. The actual transmission of the PDCCH may occupy some RBs or all RBs of the N_pdcch RBs. The reference signal of the PDCCH is determined by the occupied RB. For example, the detecting time-frequency set of the PDCCH occupies 6 RBs, which are respectively the 2th, the 4th, the 6th, the 8th, the 10th, the 12th RB of the bandwidth of the entire system. Assuming the transmission of the PDCCH by the base station occupies the 8th, the 10th, the 12th RB. Then, the length of the reference signal sequence is still determined by the three RBs. Assuming Y=3, the length of the sequence r (m) is 3*3=9. The reference signal sequences of the three RBs are r(0)~r(2), r(3)~r(5) and r(6)~r(8) respectively. The actually transmitting time-frequency resources of the PDSCH carrying the SIB1 are indicated by the PDCCH. The length of the reference signal sequence and the mapping of the reference signal is determined by the RB of frequency resources for actually transmitting the PDSCH. For example, frequency resources for actually transmitting the PDSCH is the 30th RB, then, the length of the reference signal sequence r(m) is 3 RBS, and the sequence is r(0)~r(2).

FIG. 6 through FIG. 8 are schematic diagrams according to a second embodiment of the present invention.

The Second Embodiment

In a first step: a UE receives resource configurations of the SRS, including slot configurations of the SRS, frequency resource configurations of the SRS, and delivery mode of the SRS.

The delivery mode for a resource set of SRS can be configured as at least one of the following six patterns.

Mode 1: the SRS is sent with full bandwidth.

The principle of Mode 1 is the same as that of the SRS of full bandwidth of the existing LTE system. The base station configures consecutive X RBs within the full bandwidth for the transmission of the SRS. Assuming the number of the RBs corresponding to the full bandwidth is N_RB, wherein, X≤+N_RB. The factors such as the RB reserved for the PUSCH or the RB allocated for the interval of the same subcarrier may be considered for the selection of X. The value of X may be much less the N_RB.

Preferably, the entire bandwidth may be the bandwidth of a system of the serving cell.

Mode 2: The SRS is sent simultaneously in multiple bandwidth parts within the full bandwidth of the system The base station configures frequency resources of N bandwidth parts and configures frequency resources for transmission of the SRS in the N bandwidth parts. The number of RBs for the continuous transmission of the SRS in the $i^{th}$ bandwidth part is Xi.

The N bandwidth parts may be discontinuous in frequency resources.

For example, the bandwidth of the entire system is 80 MHz. The base station is equipped with 2 bandwidth parts. One bandwidth part is 20 MHz, and the other bandwidth part is 10 MHz. The two bandwidth parts are located at the top 20 MHz and the last 10 MHz of the bandwidth of the entire system. 96 consecutive RBs for transmitting the SRS are configured in the first bandwidth part, and 40 consecutive RBs for transmitting the SRS are configured in the second bandwidth part. For example, as shown in FIG. 6, the bandwidth of the entire system is 80 MHz. The base station is equipped with 4 bandwidth parts, with each bandwidth part of 20 MHz. The four bandwidth parts are respectively configured with 60, 96, 96 and 60 contiguous RBs.

When there are UEs with different bandwidth part capabilities in the system, for example, the bandwidth of the system is 80 MHz. UE1 can only transmit on bandwidth of 20 MHz, and UE2 can only transmit on bandwidth of 80 MH. Then, the UE1 with small bandwidth capability can only send the PUCCH within the bandwidth of 20 MHz. the UE1 may send the PUCCH at the edge of a 20 MHz in the middle of the entire 80 MHz. To avoid the overlap of the PUCCH and the SRS, the UE2 may not be able to send the SRS within consecutive RBs within the 80 MHz. If the UE2 does not need to maintain a single carrier characteristic, the UE2 may simultaneously send the SRS within the four bandwidth parts of 20 MHz through mode two. However, the corresponding RBs in each bandwidth part possibly be used for transmitting the PUCCH are vacated.

Mode 3: The SRS is sent only on one bandwidth part at a time, and each transmission is fixed in the same bandwidth part.

The principle of transmitting the SRS of the mode three is the same with that of the SRS of partial bandwidth without frequency hopping of the exiting LTE system. The base station configures a bandwidth part within the reference bandwidth for transmitting the SRS. Frequency resources (RB) for transmitting the SRS in the bandwidth part are consecutive.

Preferably, the base station may configure frequency resources of the full bandwidth and the bandwidth part for transmitting the SRS within different reference bandwidth B. Frequency resources of the SRS of full bandwidth is configured as consecutive X RBs. The X RBs may be divided into different bandwidth parts according to different granularity. For example, the X RBs is divided into X/Y1 bandwidth parts, or X/Y2 bandwidth parts according to the granularity of Y1, Y2. The base station indicates the UE to transmit on which bandwidth part.

Preferably, the bandwidth B may be the bandwidth of the system of the serving cell.

Preferably, the bandwidth B configured by the base station may be used for determining reference bandwidth of the full bandwidth SRS. The base station indicates the specific location of the bandwidth, and the specific location of the frequency resources. For example, the bandwidth of the system of the serving cell is 80 MHz. The bandwidth B is 20 MHz, and the bandwidth B is the 10~30 MHz of the 80 MHz.

Mode 4: The SRS is sent only on one bandwidth part at a time. Each transmission is based on a predefined frequency hopping principle, and the SRS is sent on different bandwidth parts. The different bandwidth parts are consecutive in frequency resources.

The difference from pattern 3 is that the SRS is sent on a different bandwidth part each time according to a predefined rule. The pattern 3 is the same with the frequency modulated SRS of the existing LTE system.

Preferably, the base station may configure frequency resources of the full bandwidth and the bandwidth part for transmitting the SRS within different reference bandwidth B. The base station instructs the UE to take turns to transmit on bandwidth parts of a bandwidth part set. The bandwidth part set is a subset of the full bandwidth.

For example, the bandwidth of the system of the serving cell is 80 MHz. The reference bandwidth configured by the base station is 80 MHz. Frequency resources of the full bandwidth SRS are 320 consecutive RBs. The base station instructs that the first 160 RBs of the 320 RBs belong to a bandwidth part set, and the 160 RBs are equally divided into 4 bandwidth parts, with each bandwidth part of 40 RB. Then, the UE transmits the SRS on one of the bandwidth parts at a time, and takes turns to transmit on the 4 bandwidth parts.

Mode 5: The SRS is sent only on one bandwidth part at a time. Each transmission is based on a predefined frequency hopping principle. The SRS is sent on different bandwidth parts. The different bandwidth parts are inconsecutive in frequency resources.

It is similar to the mode 2 that the base station configures frequency resources of the N bandwidth parts and configures frequency resources for transmitting the SRS in the N bandwidth parts. The number of RBs for continuously transmitting the SRS in the $i^{th}$ bandwidth part is Xi.

What is different from mode 2 is that the UE can only transmit on a bandwidth part at a time. But the UE can take turns to transmit on the 4 bandwidth parts, as shown in FIG. 7.

This mode is feasible for UEs that must have a single carrier characteristic and need to perform channel detection within the full bandwidth of the system.

Mode 6: The SRS is transmitted only on one bandwidth part within a bandwidth part set at a time. Transmitting the SRS on which bandwidth part of the bandwidth part set is indicated by signaling.

It is similar to the mode 2 that the base station configures frequency resources of the N bandwidth parts and configures frequency resources for transmitting the SRS on the N bandwidth parts. The number of RBs for continuously transmitting the SRS in the $i^{th}$ bandwidth part is Xi. The N bandwidth parts belong to a same bandwidth part set.

What is different from mode 2 is that the UE can send on a bandwidth part at a time. The base station indicates transmitting on which bandwidth part by signaling.

Preferably, the information of configurations of delivery mode and frequency resources of the SRS may be jointly determined by multiple frequency configuration parameters.

Preferably, the frequency configurations of the SRS, may also include subcarrier spacing configurations of the SRS.

Preferably, the frequency configurations of the SRS, may include the bandwidth of a common SRS of the serving cell within the bandwidth of the system. The bandwidth of the common SRS of the serving cell should be included in all the resources that are used for transmitting the SRS by the UE within the full bandwidth of the serving sell.

Preferably, the frequency configurations of the SRS, may also include the bandwidth of a common SRS of the serving cell within the reference bandwidth. The bandwidth of the common SRS of the serving cell, should be included in all the resources that are used for transmitting the SRS within the reference bandwidth.

Preferably, the time domain configurations of the SRS may include cycle of the SRS and the slot offset of the SRS.

Preferably, the base station may configure multiple time domain resources of the cell-specific SRS and frequency resources of the SRS including bandwidth part information. The base station does not configure UE-specific time domain resources and frequency resources of the SRS. In this case, the UE determines whether the symbols of the SRS need to be vacated in the corresponding slot of the SRS and the corresponding frequency resources according to multiple time domain resources and frequency resources of the cell-specific SRS. Preferably, if the UE does not need to maintain single carrier characteristic, the UE may not map to the SRS symbol when the UE sends the PUSCH in the corresponding slot of the SRS. If the UE does not need to maintain single carrier characteristic, the UE does not map to the SRS symbol only within the indicated bandwidth part when the UE sends the PUSCH in the corresponding slot of the SRS, but the PUSCH need to be mapped to the SRS symbol in the bandwidth part that is not indicated. Similarly, if the bandwidth parts do not overlap with the PUCCH, the PUCCH can be mapped to the symbols of the SRS, otherwise, the PUCCH is not mapped to the symbols of the SRS.

Preferably, the base station may configure multiple sets of SRS for the UE. The slot configurations, frequency configurations and delivery mode of each set of SRS are independently configured. And, the periodicity, aperiodicity and semi static property of multiple sets of the SRS are also independently configured.

In a second step: The UE transmits the SRS and/or the PUSCH/PUCCH in corresponding slot of the SRS according to the indication of the base station.

The indication of the base station may indicate one delivery mode within a plurality of delivery modes of the SRS in one set of SRS. For example, when the base station configures mode one and mode two for one set of SRS, the base station can dynamically indicates which transmission mode is used according to the signaling of the physical layer.

The indication of the base station may indicate sending which set of SRS within multiple sets of SRS. For example, the base station configures three aperiodic SRS, and dynamically indicates which set of SRS is sent according to the signaling of the physical layer.

The indication of the base station may indicate which bandwidth part within the bandwidth part set within the delivery mode six is used for transmitting the SRS.

The indication of the base station may indicate whether the UE abandons transmitting the SRS. For example, for the transmission slot of the period SRS, if the UE detects that the cell-specific PDCCH or the UE-specific PDCCH indicates that the sending of the SRS is abandoned, the UE abandons transmitting the SRS. Or, if the UE detects that the cell-specific PDCCH or the UE-specific PDCCH indicates that the slot is a downlink slot, the UE abandons transmitting the SRS.

The indication of the base station may indicate whether the UE can not transmit the SRS on one or a few bandwidth parts. The UE may transmit the SRS on other unspecified bandwidth parts, or the UE may abandon transmitting the SRS on all bandwidth parts. As shown in FIG. 8, if overlap of the PUCCH and the SRS may appear in the bandwidth part 2, the base station indicates that the SRS of the bandwidth part 2 is not available, then UE2 and UE3 abandon transmitting the SRS, but the UE1 may transmit the SRS.

The indication of the base station may indicate whether the transmitting the PUSCH/PUCCH needs to avoid the symbols of the SRS in the current slot of the SRS. The indication information may also include bandwidth part information. For example, the bandwidth of 80 MHz of the system is divided into four bandwidth parts of 20 MHz.

The base station can indicate in which bandwidth part within the 4 bandwidth parts the transmission of the PUSCH/PUCCH need avoiding the symbols of the SRS.

Or the high-level configures the information of the bandwidth part, such as 2 bits, wherein, 00 means that any bandwidth part does not need avoiding the symbols of the SRS, 11 means that all bandwidth parts need avoiding the symbols of the SRS, 01 means that the first two bandwidth parts need avoiding the symbols of the SRS, 10 means that the last two bandwidth parts need avoiding the symbols of the SRS.

The Third Embodiment

In a first step: A base station configures multiple sets of reference signal of zero power.

The configured reference signal of zero power, at least includes bandwidth information. Preferably, the bandwidth information may indicate the bandwidth of the entire system, or one or more bandwidth parts within the bandwidth parts of the system. The bandwidth part information can indicate one of the predefined multiple bandwidth parts in the system, or indicate a bandwidth part composed of any one or more RBs within the full bandwidth of the system. For example, the bandwidth of 80 MHz of the system can be divided into four non-overlapping bandwidth parts with the interval of 20 MHz, and the bandwidth part is indicated when the reference signal of the zero power is configured. For example, the base station may indicate that any one or more RBs within the bandwidth of 80 MHz form a bandwidth part. The starting point and/or the size of the bandwidth part are both variable. For example, the 31th to the 130th RBs may be indicated as a bandwidth part by signaling.

The configured reference signal of zero power is indicated by the index number of the pattern of the reference signal of zero power.

The configured reference signal of zero power may also include time information, such as periodicity information, and time offset information. It is suitable for freeing resources for the periodic or semi-persistent non-zero power CSI-RS (NZP CSI-RS). And it may also apply to aperiodic NZP CSI-RS.

The configured reference signal of zero power may not include the time information. It is suitable for freeing resources for the aperiodic NZP CSI-RS.

For example, a reference signal of zero power IE can be defined as CSI-RS-ConfigZP-r14, which includes the reference signal of zero power ID: CSI-RS-ConfigZPId. The reference signal also includes the index number of the pattern of the reference signal of zero power. For example, there are X1 kinds of reference signal pattern of zero power, and the resourceConfig indicates one pattern of them. The reference signal also includes information of the slot configurations of the reference signal of zero power. For example, there are a total of X2 kinds of slot configurations, and the slotConfig indicates one of them. The reference signal also includes information of frequency resource configurations of the reference signal of zero power. For example, the information of frequency resource configurations indicates the starting point and the ending point of RB of bandwidth parts. Wherein, X3 represents the number of the RB corresponding to the maximum bandwidth of the system (calculated with the interval of reference subcarrier). Or X3 represents the group number of RB corresponding to the maximum bandwidth of the system, wherein the number of RB of one RB group is pre-defined in standards.

```
CSI-RS-ConfigZP ::= SEQUENCE {
  csi-RS-ConfigZPId CSI-RS-ConfigZPId,
  resourceConfig INTEGER (0..X1-1),
  slotConfig INTEGER (0..X2-1),
  startRB INTEGER (0..X3-1),
  EndRB INTEGER (1..X3-1),
  ...
}
```

In a second step: The base station indicates one or more sets of reference signal of zero power, which are used for reference for rate matching of the downlink PDSCH.

Once one or more sets of reference signal of zero power are configured by the high level, the rate matching of the downlink PDSCH need avoiding the resources at which the one or more sets of reference signal of zero power locate.

Preferably, one or more sets of reference signal of zero power may be configured by the high level. The rate matching of the downlink PDSCH need avoiding the resources at which the one or more sets of reference signal of zero power locate after the dynamic signaling is activated. Before the dynamic signaling is received, the rate matching of the downlink PDSCH need not avoiding the resources at which the one or more sets of reference signal of zero power locate. After the received dynamic signaling is deactivated, the rate matching of the downlink PDSCH need not avoiding the resources at which the one or more sets of reference signal of zero power locate.

The dynamic signaling may be signaling of the MAC layer, or signaling of the physical layer. The dynamic signaling may be used for triggering reference signal of non-zero power. That is, when the terminal receives the reference signal of non-zero power indicated by the signaling, the terminal considers that the rate matching of the downlink PDSCH needs avoiding the reference signal of non-zero power. Or, the dynamic signaling may be independent of the signaling that triggers reference signal of non-zero power, that is, the base station will display the activation of the reference signal of the zero power.

Preferably, one or more sets of reference signal of zero power may be configured by the high level. The rate matching of the downlink PDSCH need avoiding the resources of the one or more sets of reference signal of zero power within the corresponding one or more downlink time units according to the indication of the dynamic signaling. The rate matching of the downlink PDSCH need not avoiding the resources of the one or more sets of reference signal of zero power within other time units. For example, the cell-specific control channel or the UE-specific control channel indicates that the rate matching of the downlink PDSCH need avoiding the resources of the one or more sets of reference signal of zero power within the current downlink time unit.

Preferably, multiple groups of reference signal of zero power may be configured by semi-persistent signaling and one group of which is indicated by signaling of physical layer. One group of reference signal of zero power may be a set or more sets of reference signal of zero power, and the information of frequency resources of the multiple sets of reference signal of zero power is independently configured.

One set or multiple sets of reference signal of zero power may be indicated by common control signal of the physical layer. If the one set or multiple sets of reference signal of zero power is limited to only one or more bandwidth parts, it may be indicated by the common control signal of the physical layer of the terminal that only operate in the bandwidth part. For terminals operate at a larger bandwidth, the information of the reference signal of zero power may be obtained by reading the common control signal of the physical layer of the terminal that only operate in the bandwidth part.

One set or multiple sets of reference signal of zero power may be indicated by the control signal hold by the user in the physical layer. For example, the downlink control channel scheduling the transmission of the PDSCH.

After the terminal receives the indication information of the one set or multiple sets of reference signal of zero power, it is necessary to avoid the resources of the reference signal of the zero power when mapping the PDSCH.

FIG. 9 is a diagram of a receiving device according to an embodiment of the present application.

The Fourth Embodiment

Corresponding to the above-mentioned method, the present application also discloses a device for transmitting date which can be used for realizing the above method. As shown in FIG. 9, the apparatus includes a receiving module which is configured to receive information of one or multiple sets of resource configurations of a reference signal, wherein, the information of resource configurations of the reference signal comprises at least one of the following: information of time-frequency resource configurations of the reference signal mapped to consecutive physical resource blocks within a full bandwidth of a system, information of time-frequency resource configurations of the reference signal mapped to consecutive physical resource blocks within multiple bandwidth parts of the full bandwidth of the system, information of time-frequency resource configurations of the reference signal mapped to consecutive physical resource blocks within one bandwidth part of the full bandwidth of the system. The apparatus includes a transmitting module which is configured to transmit the reference signal according to the information of resource configurations of the reference signal and an indication for transmitting the reference signal.

FIG. 10 is a diagram of a receiving device according to another embodiment of the present application.

FIG. 10 is a diagram illustrating a device 1000 according to another embodiment of the present disclosure.

Referring to the FIG. 10, the device 1000 may include a processor 1010, a transceiver 1020 and a memory 1030. However, all of the illustrated components are not essential. The device 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the device 1000 may be implemented by the processor 1010.

The transceiver 1020 may receive information of one or multiple sets of resource configurations of a reference signal, wherein, the information of resource configurations of the reference signal comprises at least one of the following: information of time-frequency resource configurations of the reference signal mapped to consecutive physical resource blocks within a full bandwidth of a system, information of time-frequency resource configurations of the reference signal mapped to consecutive physical resource blocks within multiple bandwidth parts of the full bandwidth of the system, information of time-frequency resource configurations of the reference signal mapped to consecutive physical resource blocks within one bandwidth part of the full bandwidth of the system.

The transceiver 1020 may also transmit the reference signal according to the information of resource configurations of the reference signal and an indication for transmitting the reference signal.

The memory 1030 may store the control information or the data included in a signal obtained by the device 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

FIG. 11 is a diagram of a sending device according to an embodiment of the present application.

Corresponding to the above-mentioned method, the present application also discloses a device for transmitting date which can be used for realizing the above method. As shown in FIG. 11, the apparatus includes a time-frequency resource determining module, which is configured to determine time-frequency resources for transmitting a first type of system information and a second type of system information according to a synchronizing signal and a broadcast channel. The apparatus includes a reference signal determining module, which is configured to determine a reference signal for demodulating the first type of system information and the second type of system information according to the time-frequency resources. The apparatus includes a transmitting module, which is configured to transmit the first type of system information, the second type of system information and the corresponding reference signal.

FIG. 12 is a diagram of a sending device according to another embodiment of the present disclosure.

Referring to the FIG. 12, the device 1200 may include a processor 1210, a transceiver 1220 and a memory 1230. However, all of the illustrated components are not essential. The device 1200 may be implemented by more or less components than those illustrated in FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the device 1200 may be implemented by the processor 1010.

The processor 1210 may determine time-frequency resources for transmitting a first type of system information and a second type of system information according to a synchronizing signal and a broadcast channel.

The processor 1210 may determine a reference signal for demodulating the first type of system information and the second type of system information according to the time-frequency resources.

The transceiver 1220 may transmit the first type of system information, the second type of system information and the corresponding reference signal.

The memory 1230 may store the control information or the data included in a signal obtained by the device 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

A person of ordinary skill in the art may understand that all or some of the steps of the foregoing embodiments may be implemented by a program instructing relevant hardware. The program may be stored in a computer readable storage medium. The implementation includes one steps of the method embodiment or the combination of steps when the program is executed.

In addition, the functional units in the various embodiments of the present application may be integrated in a processing module, or each unit may be physically present, or two or more units may be integrated in one module. The above-mentioned integrated modules can be implemented either in hardware or in the form of software function modules. The integrated module may also be stored in a computer-readable storage medium if it is implemented in the form of a software function module and is sold or used as a separate product.

The aforementioned storage medium may be a read-only memory, a magnetic disk, an optical disc, or the like.

The foregoing descriptions are merely preferred embodiments of the present invention. It should be noted that for a person of ordinary skill in the art, any modification and polish, within the principle of the present disclosure shall fall within the protection scope of the present disclosure.

The invention claimed is:

1. A method performed by a terminal, the method comprising:
   receiving system information transmitted on a broadcast channel;
   obtaining, from the system information, information regarding a number of resource blocks (RBs) for a control resource set and an offset from a predetermined RB on a resource of a synchronization signal/physical broadcast channel (SS/PBCH) block;
   identifying the control resource set based on the information regarding the number of RBs and the offset;
   receiving a physical downlink control channel (PDCCH) based on the identified control resource set; and
   receiving a physical downlink shared channel (PDSCH) based on the PDCCH,
   wherein a resource element of a demodulation reference signal (DMRS) for the PDSCH is identified based on a subcarrier 0 of a lowest numbered resource block in the control resource set.

2. The method of claim 1, wherein, a resource element of a demodulation reference signal (DMRS) for the PDCCH is identified based on the subcarrier 0 of the lowest numbered resource block in the control resource set.

3. The method of claim 1, further comprising:
identifying a resource element unavailable for the PDSCH according to one or more higher layer parameters for a configuration of a zero power-channel state information-reference signal (ZP-CSI-RS),
wherein the one or more higher layer parameters includes at least one of a configuration identity parameter and a frequency occupancy parameter.

4. The method of claim 3, wherein, based on the ZP-CSI-RS being set periodic or semi-persistent, the one or more higher layer parameters further includes a periodicity and a slot offset.

5. A computer-readable recording medium on which a program for executing the method of claim 1 is recorded.

6. A method performed by a base station, the method comprising:
identifying an offset and a number of resource blocks (RBs) for a control resource set;
transmitting system information including information regarding the offset and the number of the RBs for the control resource set, on a broadcast channel;
transmitting a physical downlink control channel (PDCCH) based on the control resource set; and
transmitting a physical downlink shared channel (PDSCH) based on the PDCCH,
wherein the offset for the control resource set is identified from a predetermined RB on a resource of a synchronization signal/physical broadcast channel (SS/PBCH) block, and a resource element of a demodulation reference signal (DMRS) for the PDSCH is identified based on a subcarrier 0 of a lowest numbered resource block in the control resource set.

7. The method of claim 6, wherein, a resource element of a demodulation reference signal (DMRS) for the PDCCH is identified based on the subcarrier 0 of the lowest numbered resource block in the control resource set.

8. The method of claim 6, wherein a resource element unavailable for the PDSCH is identified according to one or more higher layer parameters for a configuration of a zero power-channel state information-reference signal (ZP-CSI-RS) and the one or more higher layer parameters include at least one of a configuration identity parameter and a frequency occupancy parameter.

9. The method of claim 8, wherein, based on the ZP-CSI-RS being set periodic or semi-persistent, the one or more higher layer parameters further includes a periodicity and a slot offset.

10. A terminal, comprising:
a transceiver; and
a processor configured to:
receive, via the transceiver, system information transmitted on a broadcast channel,
obtain, from the system information, information regarding a number of resource blocks (RBs) for a control resource set and an offset from a predetermined RB on a resource of a synchronization signal/physical broadcast channel (SS/PBCH) block,
identify the control resource set based on the information regarding the number of RBs and the offset,
receive, via the transceiver, a physical downlink control channel (PDCCH) based on the identified control resource set, and
receive, via the transceiver, physical downlink shared channel (PDSCH) based on the PDCCH,
wherein a resource element of a demodulation reference signal (DMRS) for the PDSCH is identified based on a subcarrier 0 of a lowest numbered resource block in the control resource set.

11. The terminal of claim 10, wherein a resource element of a demodulation reference signal (DMRS) for the PDCCH is identified based on the subcarrier 0 of the lowest numbered resource block in the control resource set.

12. The terminal of claim 10, wherein the processor is further configured to:
identify a resource element unavailable for a PDSCH according to one or more higher layer parameters for a configuration of a zero power-channel state information-reference signal (ZP-CSI-RS),
wherein the one or more higher layer parameters include at least one of a configuration identity parameter and a frequency occupancy parameter.

13. The terminal of claim 12, wherein, based on the ZP-CSI-RS being set periodic or semi-persistent, the one or more higher layer parameters further includes a periodicity and a slot offset.

14. A base station, comprising:
a transceiver; and
a processor configured to:
identify an offset and a number of resource blocks (RBs),
transmit, via the transceiver, system information including information regarding the offset and the number of the RBs for the control resource set, on a broadcast channel,
transmit, via the transceiver, a physical downlink control channel (PDCCH) channel based on the control resource set, and
transmit, via the transceiver, a physical downlink shared channel (PDSCH) based on the PDCCH,
wherein the offset for the control resource set is identified from a predetermined RB on a resource of a synchronization signal/physical broadcast channel (SS/PBCH) block, and a resource element of a demodulation reference signal (DMRS) for the PDSCH is identified based on a subcarrier 0 of a lowest numbered resource block in the control resource set.

\* \* \* \* \*